United States Patent
Fischer et al.

(10) Patent No.: US 9,251,348 B2
(45) Date of Patent: *Feb. 2, 2016

(54) DETECTION OF RETURN ORIENTED PROGRAMMING ATTACKS

(71) Applicant: Intel Corporation, Santa Clara, CA (US)

(72) Inventors: Stephen A. Fischer, Gold River, CA (US); Kevin C. Gotze, Hillsboro, OR (US); Yuriy Bulygin, Beaverton, OR (US); Kirk D. Brannock, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/799,663

(22) Filed: Mar. 13, 2013

(65) Prior Publication Data

US 2014/0123286 A1 May 1, 2014

Related U.S. Application Data

(63) Continuation of application No. 13/664,532, filed on Oct. 31, 2012.

(51) Int. Cl.
*G06F 21/50* (2013.01)
*G06F 21/56* (2013.01)

(52) U.S. Cl.
CPC .................... *G06F 21/566* (2013.01)

(58) Field of Classification Search
None
See application file for complete search history.

(56) References Cited

U.S. PATENT DOCUMENTS

| | | | |
|---|---|---|---|
| 5,944,821 A | 8/1999 | Angelo | |
| 6,578,094 B1 | 6/2003 | Moudgill | |
| 6,802,006 B1 | 10/2004 | Bodrov | |
| 6,941,473 B2* | 9/2005 | Etoh et al. | 726/5 |
| 7,272,748 B1 | 9/2007 | Conover et al. | |
| 7,287,283 B1 | 10/2007 | Szor | |
| 7,581,089 B1 | 8/2009 | White | |
| 7,594,111 B2 | 9/2009 | Kiriansky et al. | |
| 7,631,249 B2 | 12/2009 | Borde et al. | |
| 8,566,944 B2 | 10/2013 | Peinado et al. | |
| 2001/0044904 A1 | 11/2001 | Berg et al. | |
| 2002/0144141 A1 | 10/2002 | Edwards et al. | |
| 2003/0145226 A1 | 7/2003 | Bruton et al. | |
| 2007/0180524 A1 | 8/2007 | Choi et al. | |
| 2008/0015808 A1 | 1/2008 | Wilson et al. | |
| 2008/0016314 A1 | 1/2008 | Li et al. | |
| 2008/0060077 A1 | 3/2008 | Cowan et al. | |

(Continued)

OTHER PUBLICATIONS

Davi et al, "ROPdefender: A Detection Tool to Defend Against Return-Oriented Programming Attacks", Mar. 2011, ASIACCS '11, p. 40-51.*

(Continued)

*Primary Examiner* — Christopher Revak
(74) *Attorney, Agent, or Firm* — Trop, Pruner & Hu, P.C.

(57) ABSTRACT

In one embodiment, a processor includes at least one execution unit and Return Oriented Programming (ROP) detection logic. The ROP detection logic may determine a ROP metric based on a plurality of control transfer events. The ROP detection logic may also determine whether the ROP metric exceeds a threshold. The ROP detection logic may also, in response to a determination that the ROP metric exceeds the threshold, provide a ROP attack notification.

21 Claims, 12 Drawing Sheets

(56) References Cited

U.S. PATENT DOCUMENTS

| | | | |
|---|---|---|---|
| 2008/0216175 | A1 | 9/2008 | Pike |
| 2009/0144309 | A1 | 6/2009 | Cabrera et al. |
| 2010/0122088 | A1 | 5/2010 | Oxford |
| 2010/0175132 | A1* | 7/2010 | Zawadowskiy et al. ........ 726/23 |
| 2011/0145921 | A1 | 6/2011 | Mathur et al. |
| 2011/0277035 | A1 | 11/2011 | Singh et al. |
| 2012/0030758 | A1* | 2/2012 | van den Berg et al. ......... 726/22 |
| 2012/0167120 | A1* | 6/2012 | Hentunen ..................... 719/320 |
| 2012/0297485 | A1* | 11/2012 | Maeda et al. ................... 726/23 |
| 2013/0014221 | A1 | 1/2013 | Moore et al. |
| 2013/0036464 | A1 | 2/2013 | Glew et al. |
| 2013/0117843 | A1* | 5/2013 | Komaromy et al. ............ 726/22 |
| 2013/0185792 | A1* | 7/2013 | Balakrishnan et al. ......... 726/22 |
| 2014/0020092 | A1* | 1/2014 | Davidov ......................... 726/22 |
| 2014/0075556 | A1* | 3/2014 | Wicherski ...................... 726/23 |
| 2014/0096245 | A1 | 4/2014 | Fischer |
| 2014/0096247 | A1 | 4/2014 | Fischer |
| 2014/0123281 | A1 | 5/2014 | Fischer |

OTHER PUBLICATIONS

Lu et al, "deROP: Removing Return-Oriented Programming from Malware", Dec. 2011, ACSAC '11, p. 363-372.*

Shacham, "The Geometry of Innocent Flesh on the Bone: Return-into-libc without Function Calls (on the x86)", Nov. 2007, CCS '07, p. 552-561.*

Checkoway et al, "Return-Oriented Programming with Returns", Oct. 2010, CCS '10, p. 559-572.*

Roemer, R. et al.; "Return-Oriented Programming: Systems, Languages, and Applications", University of California, San Diego; ACM Transactions on Information and System Security (TISSEC), Mar. 2012, 42 pages.

Buchanan, E. et al., "Return-Oriented Programming: Exploitation Without Code Injection", University of California, San Diego; Presentation at Black Hat USA 2008 Briefings, Aug. 2008, 53 pages.

Zovi, D., "Return-Oriented Exploitation"; Presentation at Black Hat USA 2010 Briefings, Jul. 2010, 91 pages.

Vasilis Pappas, 'kBouncer: Efficient and Transparent ROP Mitigation', Apr. 1, 2012, Retrieved from http://www.cs.columbia.edu/~vapappas/papers/kbouncer.pdf See pp. 1-2, 5-6.

Liwei Yuan et al.,'Security Breaches as PMU Deviation: Detecting and Identifying Security Attacks Using Performance Counters', In: Proceedings of the Second Asia-Pacific Workshop on Systems, Shanghai, China, Jul. 11-12, 2011, Article No. 6 See pp. 1-3, 5.

International Searching Authority, "Notification of Transmittal of the International Search Report and the Written Opinion of the International Searching Authority," mailed Nov. 14, 2013, in International application No. PCT/US2013/048531.

Buchanan, E. et al., When Good Instructions Go Bad: Generalizing Return-Oriented Programming to RISC, in: Proceedings of 15th ACM Conference on Computer and Communications Security 2008, ACM Press, Alexendria, Virginia, USA, Oct. 27-31, 2008, pp. 28-38.

U.S. Patent and Trademark Office, Office Action mailed Nov. 14, 2014, with Reply filed Mar. 11, 2015, in U.S. Appl. No. 13/664,532.

U.S. Patent and Trademark Office, Final Office Action mailed Nov. 26, 2014, with Request for Continued Examination filed Feb. 25, 2015, in U.S. Appl. No. 13/799,612.

U.S. Patent and Trademark Office, Office Action mailed Aug. 7, 2014, with Reply filed Nov. 6, 2014, in U.S. Appl. No. 13/799,612.

U.S. Patent and Trademark Office, Office Action mailed Nov. 13, 2013, with Reply filed Feb. 12, 2014, in U.S. Appl. No. 13/631,342.

U.S. Patent and Trademark Office, Office Action mailed Sep. 25, 2014, with Reply filed Dec. 29, 2014, in U.S. Appl. No. 13/631,342.

U.S. Patent and Trademark Office, Office Action mailed Mar. 12, 2014, with Reply filed Jun. 12, 2014, in U.S. Appl. No. 13/664,532.

U.S. Patent Trademark Office, Office Action mailed on Mar. 23, 2015 and Reply filed on May 21, 2015, in U.S. Appl. No. 13/631,342.

Cowan, et al., "StackGuard: Automatic Adaptive Detection and Prevention of Buffer-Overflow Attacks," 7th USENIX Security Symposium, Jan. 26-29, 1998, pp. 1-15.

U.S. Patent and Trademark Office, Notice of Allowance mailed Jun. 22, 2015, in U.S. Appl. No. 13/799,612.

U.S. Patent and Trademark Office, Office Action mailed on Mar. 23, 2015 and Reply filed on May 21, 2015, in U.S. Appl. No. 13/631,342.

U.S. Patent and Trademark Office, Office Action mailed on Jun. 17, 2015 and Reply filed on Aug. 11, 2015, in U.S. Appl. No. 13/664,532.

* cited by examiner

US 9,251,348 B2

DETECTION OF RETURN ORIENTED PROGRAMMING ATTACKS

This application is a continuation of U.S. patent application Ser. No. 13/664,532, filed Oct. 31, 2012, the content of which is hereby incorporated by reference.

BACKGROUND

Embodiments relate generally to computer security.

Computer exploits are techniques which may be used to compromise the security of a computer system or data. Such exploits may take advantage of a vulnerability of a computer system in order to cause unintended or unanticipated behavior to occur on the computer system. For example, Return Oriented Programming (ROP) exploits may involve identifying a series of snippets of code that are already available in executable memory (e.g., portions of existing library code), and which are followed by a return instruction (e.g., a RET instruction). Such snippets may be chained together into a desired execution sequence by pushing a series of pointer values onto the call stack and then tricking the code into execution the first pointer value. This chained execution sequence does not follow the intended program execution order that the original program author intended, but may instead follow an alternative execution sequence. In this manner, an attacker may create a virtual program sequence without requiring injection of external code.

DETAILED DESCRIPTION

In accordance with some embodiments, detection of Return Oriented Programming (ROP) attacks may be provided. In one or more embodiments, ROP attacks may be detected based on a ROP metric (e.g., a metric indicating the likelihood that a system is under a current ROP attack). In some embodiments, the ROP metric is generated based at least in part on control transfer events, meaning instances of instructions and/or states that are associated with ROP attacks. For example, in some embodiments, control transfer events may include instances of control transfer instructions such as subroutine call instructions, subroutine return instructions, branch or jump instructions, etc. Further, in some embodiments, control transfer events may include pairs of associated instructions (i.e., specific types of instructions executed within a given range of each other). Furthermore, in some embodiments, control transfer events may include branch or return mispredictions.

Figure 1A:
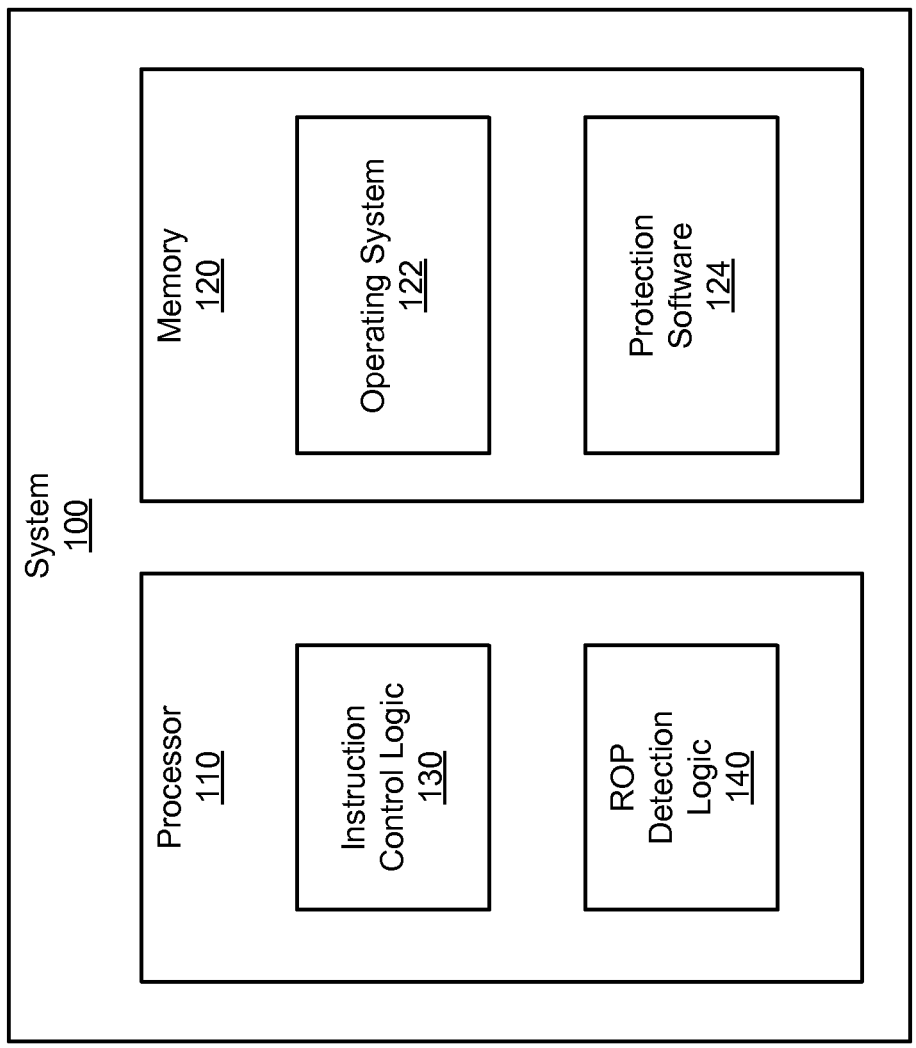
FIGS. 1A-1B are block diagrams of systems in accordance with one or more embodiments.

Referring to FIG. 1A, shown is a block diagram of a system 100 in accordance with one or more embodiments. As shown in FIG. 1A, the system 100 may include a processor 110 and a memory 120. In accordance with some embodiments, the system 100 may be all or a portion of any electronic device, such as a cellular telephone, a computer, a server, a media player, a network device, etc.

In accordance with some embodiments, the memory 120 may include an operating system (OS) 122 and protection software 124. In some embodiments, the operating OS 122 and/or the protection software 124 may include functionality to protect the system 100 against computer exploits and attacks. For example, the protection software 124 may be an anti-virus application, an intrusion detector, a network firewall, etc.

As shown, in some embodiments, the processor 110 may include instruction control logic 130 and ROP detection logic 140. In one or more embodiments, the instruction control logic 130 may include functionality to manage and/or optimize the performance characteristics of the processor 110. For example, the instruction control logic 130 may include functionality for performance profiling, logging, pre-fetching, branch prediction, tuning, etc. Further, in some embodiments, the ROP detection logic 140 may include functionality to detect a ROP attack against the system 100. This functionality of the ROP detection logic 140 is described further below with reference to FIGS. 1B, 2, and 3A-3E.

In one or more embodiments, the ROP detection logic 140 may be implemented in any form of hardware, software, and/or firmware. For example, the ROP detection logic 140 may be implemented in microcode, programmable logic, hard-coded logic, control logic, instruction set architecture, processor abstraction layer, etc. Further, the ROP detection logic 140 may be implemented within the processor 110, and/or any other component accessible or medium readable by processor 110, such as memory 120. While shown as a particular implementation in the embodiment of FIG. 1A, the scope of the various embodiments discussed herein is not limited in this regard.

Figure 1B:
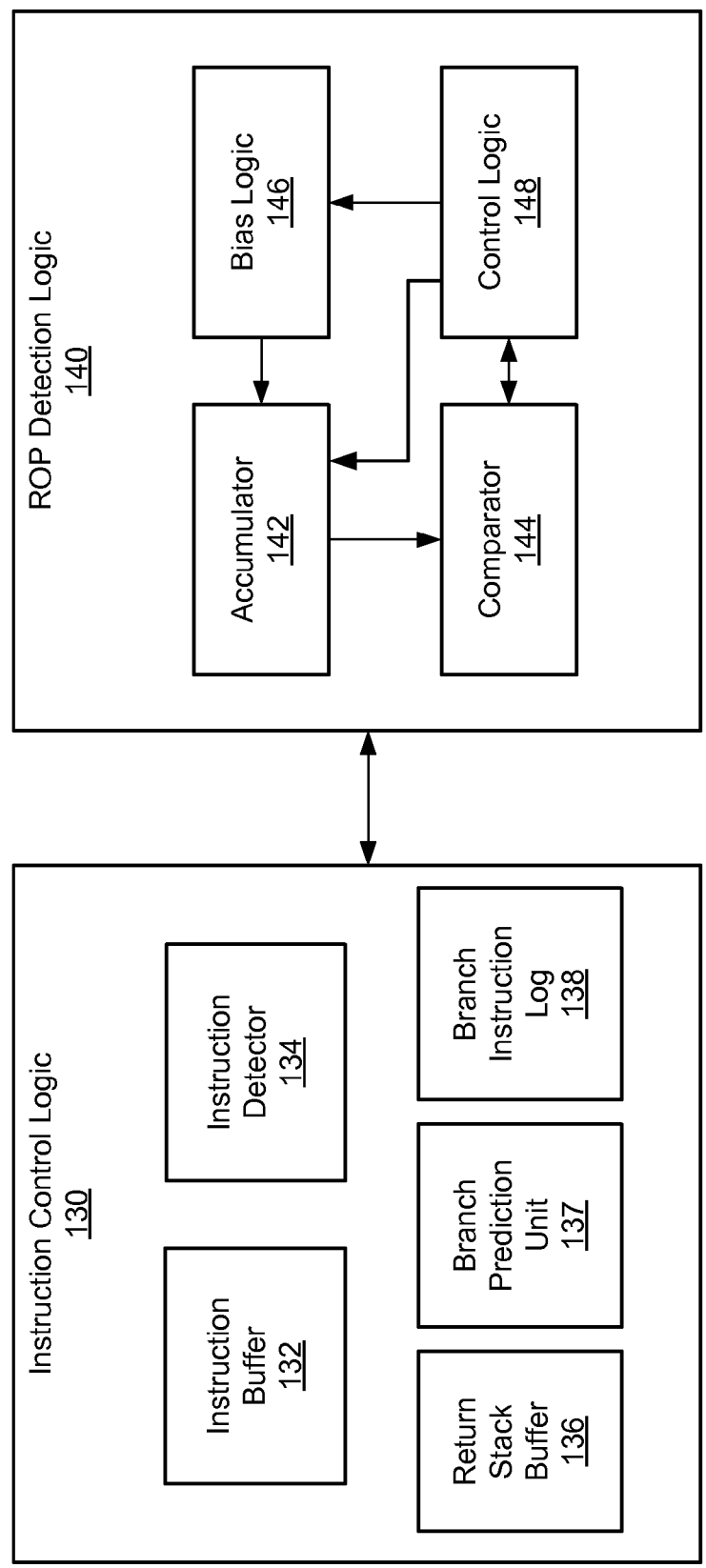

Referring now to FIG. 1B, shown are block diagrams of the instruction control logic 130 and the ROP detection logic 140 in accordance with one or more embodiments. As shown, in some embodiments, the instruction control logic 130 may include an instruction buffer 132, an instruction detector 134, a return stack buffer 136, a branch prediction unit 137, and a branch instruction log 138.

In one or more embodiments, the instruction buffer 132 may be a buffer including entries corresponding to instructions processed in the processor 110. For example, in some embodiments, the instruction buffer 132 may be an instruction retirement buffer. In such embodiments, as each instruction is completed, a corresponding entry is cleared from the instruction buffer 132. Such instructions may include, e.g., subroutine call instructions (e.g., CALL), subroutine return instructions (e.g., RET), branch or jump instructions (e.g., IF-THEN, JMP, GOTO), stack instructions (e.g., PUSH, POP), etc.

In one or more embodiments, the instruction detector 134 includes functionality to detect entries of the instruction buffer 132 that correspond to control transfer instructions associated with ROP attacks. For example, in some embodiments, the instruction detector 134 may detect entries corresponding to subroutine call instructions, subroutine return instructions, branch or jump instructions, stack instructions, etc. Further, in response to detecting such entries, the instruction detector 134 may send a detection signal to the ROP detection logic 140. In some embodiments, the detection signal may indicate the type of the detected instruction.

In one or more embodiments, the return stack buffer 136 stores return pointers for use in performance optimization of the processor 110 (i.e., return prediction). For example, when a call to a subroutine is executed in a program, the instruction control logic 130 may predict that a corresponding return from the subroutine will be subsequently performed. Accordingly, in some embodiments, a return pointer may be pushed onto the return stack buffer 136 in anticipation of executing the predicted return instruction.

In accordance with some embodiments, the branch prediction unit 137 includes functionality to predict the future direction of a branch executed by the processor 110. In some embodiments, the predictions provided by the branch prediction unit 137 may be used to fetch instructions so that they can be readied for execution and/or speculatively executed, thereby saving some of the time that would be required to fetch the instructions when the branch is taken. In one or more embodiments, the branch prediction unit 137 may include functionality to identify correct and incorrect branch predictions. For example, the branch prediction unit 137 may identify all incorrectly predicted branches, and/or may identify specific types of branch mispredictions, such as mispredicted indirect branches (i.e., branches where the branch target is held in a register or memory), mispredicted far branch instructions (i.e., branches that perform a control transfer that also involves changing the code segment), etc.

In accordance with some embodiments, the branch instruction log 138 may store address information for a given number of the most recent branch related instructions. For example, in some embodiments, the branch instruction log 138 may store source and destination addresses for the last sixteen branch related instructions (including call and return instructions) processed in the processor 110. Such functionality of the branch instruction log 138 may be used for debugging purposes, and may be referred to as Last Branch Record (LBR) functionality.

In some embodiments, the branch instruction log 138 may include functionality to selectively freeze its contents, meaning to stop updating the stored address information at a specific point in time, regardless of whether any new branch related instructions are executed subsequently. In one or more embodiments, the freeze function may be triggered based on a signal received from the ROP detection logic 140.

As shown, in some embodiments, the ROP detection logic 140 includes an accumulator 142, a comparator 144, bias logic 146, and control logic 148. In one or more embodiments, the accumulator 142 includes functionality to generate a count based on control transfer events occurring during a defined window. Specifically, in some embodiments, the accumulator 142 may increment or decrement a counter in response to detecting instances of control transfer instructions (e.g., call or return instructions, branch or jump instructions, etc.) and/or mispredictions of control transfer instructions. For example, in some embodiments, the accumulator 142 may increment the counter in response to detecting a control transfer instruction associated with popping (i.e., removing) an instruction return pointer value from the call stack (e.g., a return instruction). Further, in some embodiments, the accumulator 142 may decrement the counter in response to a detecting a control transfer instruction associated with pushing (i.e., storing) an instruction return pointer value on the call stack (e.g., a call instruction).

In one or more embodiments, the accumulator 142 may detect instances of control transfer instructions using the instruction detector 134. For example, the accumulator 142 may increment the counter in response to receiving a detection signal indicating the detection of a return instruction. Further, in some embodiments, the accumulator 142 may decrement the counter in response to receiving a detection signal indicating the detection of a call instruction. Note that, in normal operation (i.e., when not under a ROP attack), a call instruction is typically followed some instructions later by a corresponding return instruction. Accordingly, in normal operation, counter increases are generally balanced by counter decreases, and thus the counter will remain within a specific range around the zero value. However, in the event of a ROP attack, the number of return instructions may substantially exceed the number of call instructions (referred to as a return-call imbalance). Therefore, under a ROP attack, the counter may increase beyond the specific range around the zero value. Thus, in this example, the counter value may be used as a ROP metric.

In one or more embodiments, the accumulator 142 may interact with the return stack buffer 136 to detect return predictions and/or mispredictions, and to increment/decrement the count based on such detections. For example, in some embodiments, the accumulator 142 may increment a counter in response to detecting a mispredicted return instruction. Further, in some embodiments, the accumulator 142 may decrement the counter in response to detecting a correctly predicted return instruction.

In one or more embodiments, the accumulator 142 may interact with the branch prediction unit 137 to detect branch predictions and mispredictions, and to increment/decrement the count based on such detections. For example, in some embodiments, the accumulator 142 may increment a counter in response to detecting any mispredicted branch instruction. Further, in some embodiments, the accumulator 142 may decrement the counter in response to detecting any correctly predicted branch instruction. In another example, in some embodiments, the accumulator 142 may increment a counter in response to detecting a particular type of mispredicted branch (e.g., a mispredicted indirect branch, a mispredicted far branch, etc.).

In one or more embodiments, the accumulator 142 may also detect instances of stack pivots (e.g., a return instruction associated with an instruction moving the stack pointer to a new memory location). Further, in response to detecting a stack pivot, the accumulator 142 may increment the counter by some amount (e.g., 1, 2, 5, etc.).

In one or more embodiments, the accumulator 142 may adjust a single counter based on multiple types of control transfer events (e.g., call instructions, return instructions, mispredictions, etc.). Further, in some embodiments, the accumulator 142 may include separate counters, each corresponding to a different type of control transfer event. Alternatively, in some embodiments, the ROP detection logic 140 includes multiple accumulators 142, each corresponding to a different type of control transfer event.

In one or more embodiments, the accumulator 142 may be limited to a predefined window. For example, the accumulator 142 may reset the count after a specific number of instructions (e.g., 10, 100, 1000, etc.) are processed in the processor 110. In another example, the accumulator 142 may be a circular buffer storing a given number of instructions. In yet another example, the accumulator 142 may reset the count after a given time period (e.g., 1 millisecond, 1 second, 1 minute, etc.) has expired. In such embodiments, the counter may reflect a return-call imbalance occurring within the predefined window (e.g., ten more return instructions than call instructions processed during a window of 1000 instructions). In some embodiments, the accumulator 142 may include a saturating mode to prevent the count from exceeding maximum and/or minimum limits. For example, in some embodiments, the accumulator 142 may clip the count to a maximum count limit (e.g., a hardware buffer capacity) in the case of a count increment, and/or may clip the count to the minimum count limit in the case of a count decrement.

In accordance with some embodiments, the comparator 144 includes functionality to provide an attack notification when the count of the accumulator 142 exceeds a predefined threshold. In some embodiments, the predefined threshold may be set to a count level or percentage that indicates a high probability that the system 100 is under a ROP attack. For example, assume that the count of the accumulator 142 is to indicate a return-call imbalance during a window of one hundred instructions. Assume further that, before completing the window of one hundred instructions, the comparator 144 determines that the count of the accumulator 142 reaches eleven, and thereby exceeds a predefined threshold of ten (i.e., a count of positive ten). Therefore, in this example, the comparator 144 may trigger an attack notification (e.g., an interrupt, an exception, etc.) to indicate that the system 100 is probably under a ROP attack. Further, in some embodiments, the attack notification may be sent to the OS 122 and/or the protection software 124. In response, in one or more embodiments, the OS 122 and/or the protection software 124 may undertake actions to prevent and/or interrupt the ROP attack (e.g., system or process stoppage, memory quarantine, event logging, user notification, etc.). For example, the OS 122 and/or protection software 124 may determine that the ROP detection is false based on the system process state, and may thus allow the process to continue execution. In some embodiments, the OS 122 and/or protection software 124 may examine the state of the branch instruction log 138 as part of such a determination.

Note that, while the functionality of the accumulator 142 and/or the comparator 144 is described above in terms of the example of a return-call imbalance, embodiments are not limited in this regard. In particular, in some embodiments, the accumulator 142 and/or the comparator 144 may use any other type of control transfer event, or any combination of types of control transfer events. For example, in some embodiments, the accumulator 142 may increment the count in response to instances of control transfer instructions, without decrementing the count. In another example, in some embodiments, the accumulator 142 may increment and/or decrement the count in response to detecting control transfer instructions that are associated with stack-related instructions (e.g., a jump instruction using a pointer associated with a pop instruction, a jump instruction using a pointer associated with a push instruction, etc.). In yet another example, the accumulator 142 may increment and/or decrement the count in response to detecting control transfer instructions that are associated with instructions to change the stack pointer value (e.g., a return instruction associated with a move instruction). In still another example, in some embodiments, the accumulator 142 may increment the count in response to return mispredictions and/or branch mispredictions. This functionality of the accumulator 142 and/or the comparator 144 is described further below with reference to FIGS. 3A-3D.

In one or more embodiments, the ROP detection logic 140 may include multiple sets of components (e.g., accumulator 142, comparator 144, etc.), with each set corresponding to a different type of control transfer event. For example, in some embodiments, the ROP detection logic 140 may include a first accumulator 142 to generate a first count based on detections of return instructions, and may include a second accumulator 142 to generate a second count based on branch mispredictions. In some embodiments, the counts generated by such sets may be combined to generate a single ROP metric. Alternatively, in some embodiments, the count generated by each set may correspond to a different ROP metric which may be evaluated to detect ROP attacks. In such embodiments, the control logic 148 may evaluate each ROP metric separately using a different threshold and/or window, and may trigger an attack notification if any single ROP metric exceeds its corresponding threshold. Optionally, in some embodiments, the control logic 148 may only trigger an attack notification if at least a predefined number of ROP metrics exceed their associated thresholds. Further, in such embodiments, each ROP metric may be weighted by a respective weight or importance.

In one or more embodiments, the bias logic 146 includes functionality to bias or adjust the accumulator 142 to reduce any effects due to natural imbalances (i.e., an imbalance or bias that is not caused by ROP attacks). Specifically, in some embodiments, the bias logic 146 may periodically divide or reduce the count of the accumulator 142 over a given period. For example, in one or more embodiments, the bias logic 146 may shift the accumulator 142 to the right by one bit in order to divide the count by two. In such a manner, the bias logic 146 may offset or reduce any natural imbalances that may be inherent in the system 100 (e.g., imbalances due to program exits, error states, etc.).

In one or more embodiments, the control logic 148 includes functionality to manage the ROP detection logic 140. In some embodiments, such functionality may include adjusting the sensitivity of the ROP detection logic 140 based on an estimated threat level and/or desired level of protection against ROP attacks (e.g., low, medium, high, etc.). For example, the control logic 148 may increase the threshold used by the comparator 144 in response to a lowered threat or protection level, thereby requiring a greater imbalance to occur in the accumulator 142 before triggering an attack notification (i.e., decreasing sensitivity to an ROP attack). Similarly, the control logic 148 may lower the threshold used by the comparator 144 in response to a heightened threat or protection level, thereby requiring a smaller imbalance to occur in the accumulator 142 before triggering an attack notification (i.e., increasing sensitivity to an ROP attack). In another example, the control logic 148 may increase or decrease the length of the window used by the accumulator 142 to adjust sensitivity to an ROP attack. In yet another example, the control logic 148 may adjust the biasing effect of the bias logic 146 to compensate for system changes which may affect any natural imbalances.

Figure 2:
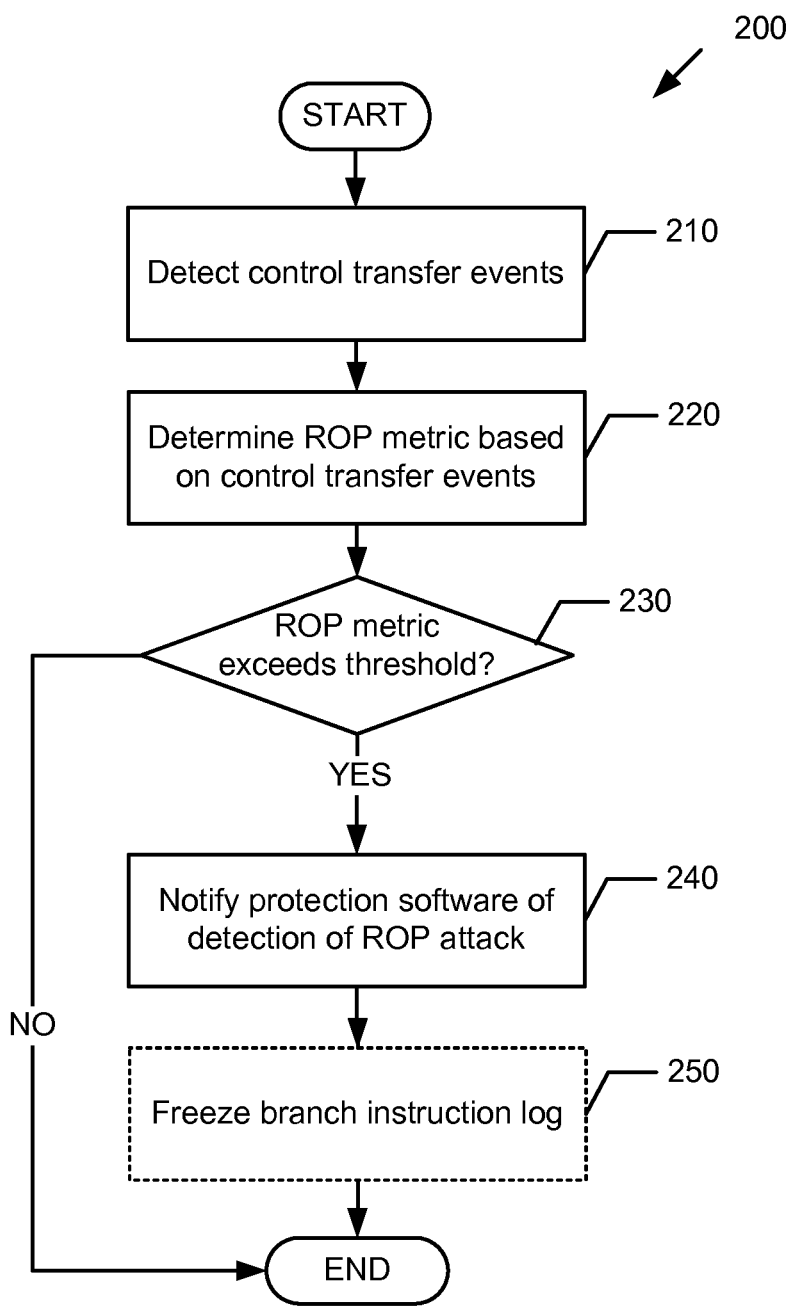
FIG. 2 is a sequence in accordance with one or more embodiments.

Referring now to FIG. 2, shown is a sequence 200 for detecting a ROP attack, in accordance with one or more embodiments. In one or more embodiments, the sequence 200 may be part of the ROP detection logic 140 shown in FIG. 1A. The sequence 200 may be implemented in hardware, software, and/or firmware. In firmware and software embodiments it may be implemented by computer executed instructions stored in a non-transitory computer readable medium, such as an optical, semiconductor, or magnetic storage device.

At step 210, control transfer events may be detected. For example, referring to FIG. 1B, the instruction detector 134 may detect instances of control transfer instructions (e.g., call instructions, return instructions, branch or jump instructions, etc). In another example, the branch prediction unit 137 may detect mispredictions of control transfer instructions.

At step 220, an ROP metric may be determined based on the control transfer events (detected at step 210). In one or more embodiments, the ROP metric may be a count value based on instances of control transfer instructions and/or mispredictions. Further, in some embodiments, the ROP metric may be limited to a predefined window. For example, referring to FIG. 1B, the accumulator 142 may increment and/or decrement a counter in response to a detection of a particular type of instruction (e.g., a return instruction, a call instruction, a branch instruction, a far branch instruction, etc.). In another example, the accumulator 142 may increment and/or decrement the counter in response to associated pairs of instructions (e.g., a push or pop instruction associated with a jump instruction, a return instruction associated with an instruction moving the stack pointer, etc.). In some embodiments, the accumulator 142 may detect the aforementioned instructions based on a signal from the instruction detector 134. In yet another example, the accumulator 142 may increment and/or decrement the counter in response to a branch misprediction (e.g., determined by interacting with the branch prediction unit 137). In still another example, the accumulator 142 may increment and/or decrement the counter in response to a return misprediction (e.g., determined by interacting with the return stack buffer 136). The steps involved in performing step 220 are discussed in greater detail below with reference to FIGS. 3A-3E.

At step 230, a determination about whether the metric exceeds a predefined threshold is made. In one or more embodiments, the predefined threshold may correspond to a level of the metric that indicates that a system is probably under ROP attack. For example, referring to FIG. 1B, the comparator 144 may determine whether the count of the accumulator 142 exceeds a predefined threshold.

If it is determined at step 230 that the metric does not exceed the predefined threshold, then the sequence 200 ends. However, if it is determined at step 230 that the metric exceeds the predefined threshold, then at step 240, protection software (e.g., an anti-malware application) may be notified that a ROP attack has been detected. For example, referring to FIG. 1A, the ROP protection logic 140 may send an ROP attack notification (e.g., an interrupt, an exception, etc.) to the protection software 124 and/or the operating system 122 to indicate that a possible ROP attack has been detected. In some embodiments, the ROP attack notification may trigger the protection software to take one or more actions to address the ROP attack (e.g., monitor suspected code, quarantine suspected code, notify an administrator or a management system, halt execution, shut down a system, etc.).

At step 250, in some embodiments, a branch instruction log may be frozen in response to determining (at step 230) that the metric exceeds the predefined threshold. For example, referring to FIG. 1B, the contents of the branch instruction log 138 may be frozen (i.e., no longer updated) in response to a signal from the control logic 148. In some embodiments, the contents of the branch instruction log 138 may then be provided to the protection software 124 (shown in FIG. 1A) for use in analyzing and/or addressing the possible ROP attack. After step 250, the sequence 200 ends.

Figure 3A:
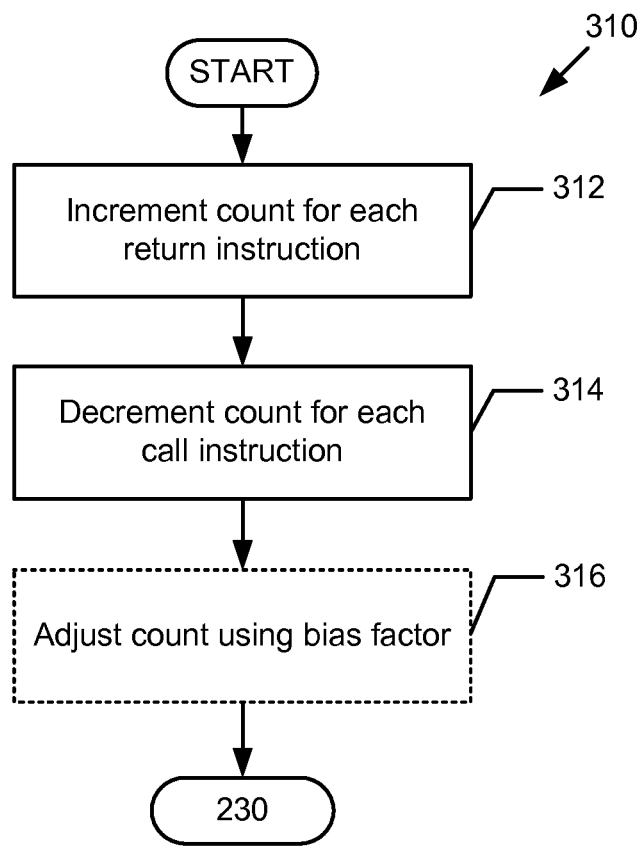
FIGS. 3A-3E are sequences in accordance with one or more embodiments.

Referring now to FIG. 3A, shown is a sequence 310 for determining a metric, in accordance with one or more embodiments. In particular, the sequence 310 illustrates an exemplary expansion of the steps involved in performing step 220 (shown in FIG. 2). In one or more embodiments, the sequence 310 may be part of the ROP detection logic 140 shown in FIG. 1A. The sequence 310 may be implemented in hardware, software, and/or firmware. In firmware and software embodiments it may be implemented by computer executed instructions stored in a non-transitory computer readable medium, such as an optical, semiconductor, or magnetic storage device.

At step 312, a count may be incremented for each instance of a return instruction. For example, referring to FIG. 1B, the accumulator 142 may receive a signal from the instruction detector 134 indicating the detection of a return instruction. In response to receiving this signal, the accumulator 142 may increment a counter by one.

At step 314, the count may be decremented for each instance of a call instruction. For example, referring to FIG. 1B, the accumulator 142 may receive a signal from the instruction detector 134 indicating the detection of a call instruction. In response to receiving this signal, the accumulator 142 may decrement the counter by one. In one or more embodiments, the counter value may correspond to a return-call imbalance metric.

At step 316, the count may optionally be adjusted by a bias factor. For example, referring to FIG. 1B, the bias logic 146 may determine a need to reduce the counter of the accumulator 142 to compensate for natural return-call imbalances in the system 100. Accordingly, the bias logic 146 may shift the accumulator 142 to the right by one bit in order to divide the counter value by two, thereby reducing the effect of the natural imbalances. After step 316, the sequence 310 continues at step 230 (shown in FIG. 2).

Optionally, in some embodiments, step 314 may be omitted from the sequence 310. For example, referring to FIG. 1B, the accumulator 142 may increment the count in response to instances of return instructions, without decrementing the count in response to instances of call instructions. Accordingly, in such embodiments, the counter value of the accumulator 142 may not correspond to a return-call imbalance metric, but may instead correspond to a metric of the number of return instructions executed during the predefined window of the accumulator 142.

Figure 3B:
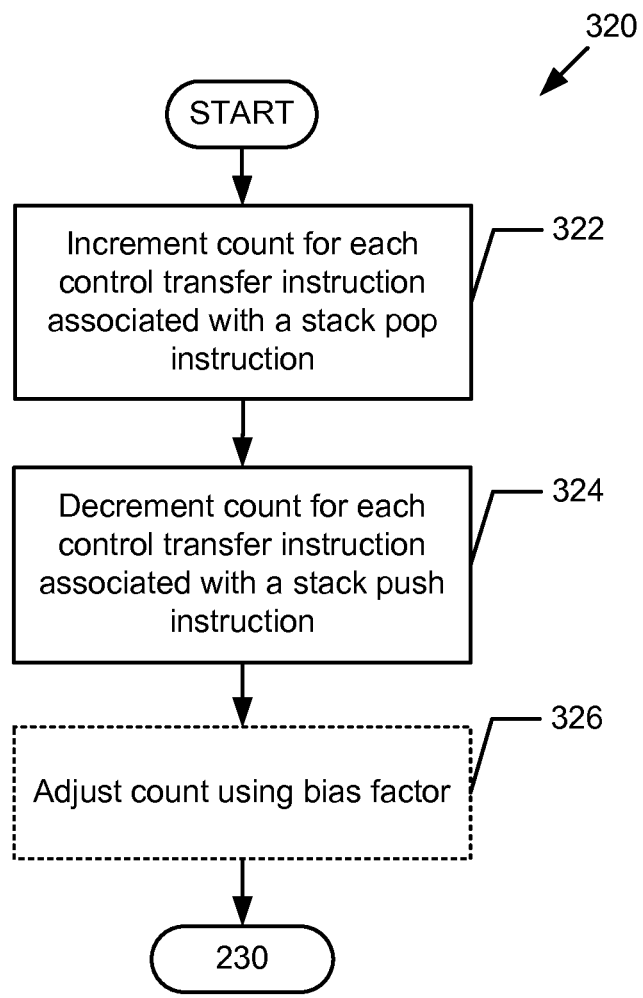

Referring now to FIG. 3B, shown is a sequence 320 for determining a metric, in accordance with one or more embodiments. In particular, the sequence 320 illustrates an exemplary expansion of the steps involved in performing step 220 (shown in FIG. 2). In one or more embodiments, the sequence 320 may be part of the ROP detection logic 140 shown in FIG. 1A. The sequence 320 may be implemented in hardware, software, and/or firmware. In firmware and software embodiments it may be implemented by computer executed instructions stored in a non-transitory computer readable medium, such as an optical, semiconductor, or magnetic storage device.

At step 322, a count may be incremented for each instance of a control transfer instruction associated with a stack pop instruction. For example, referring to FIG. 1B, the accumulator 142 may determine whether a jump instruction and a stack pop instruction are executed within a predefined distance (i.e., a number of instructions) of each other. In some embodiments, the association between the jump instruction and a stack pop instruction may be determined based on whether the target value from the stack pop instruction is used by the jump instruction. Further, in some embodiments, such a pair of associated instructions may be functionally similar to a return instruction, and may thus be indicative of a possible ROP attack. Accordingly, if a pair of associated instructions is detected, the accumulator 142 may increment a counter by one.

At step 324, the count may be decremented for each instance of a control transfer instruction associated with a stack push instruction. In some embodiments, such a pair of associated instructions may be functionally similar to a call instruction. For example, referring to FIG. 1B, the accumulator 142 may determine whether a jump instruction and a stack push instruction are executed within a predefined distance, and if so, may decrement the counter by one.

At step 326, the count may optionally be adjusted by a bias factor. For example, referring to FIG. 1B, the bias logic 146 may divide or otherwise reduce the counter value of the accumulator 142 in order to reduce the effect of the natural imbalances. After step 326, the sequence 320 continues at step 230 (shown in FIG. 2).

Figure 3C:
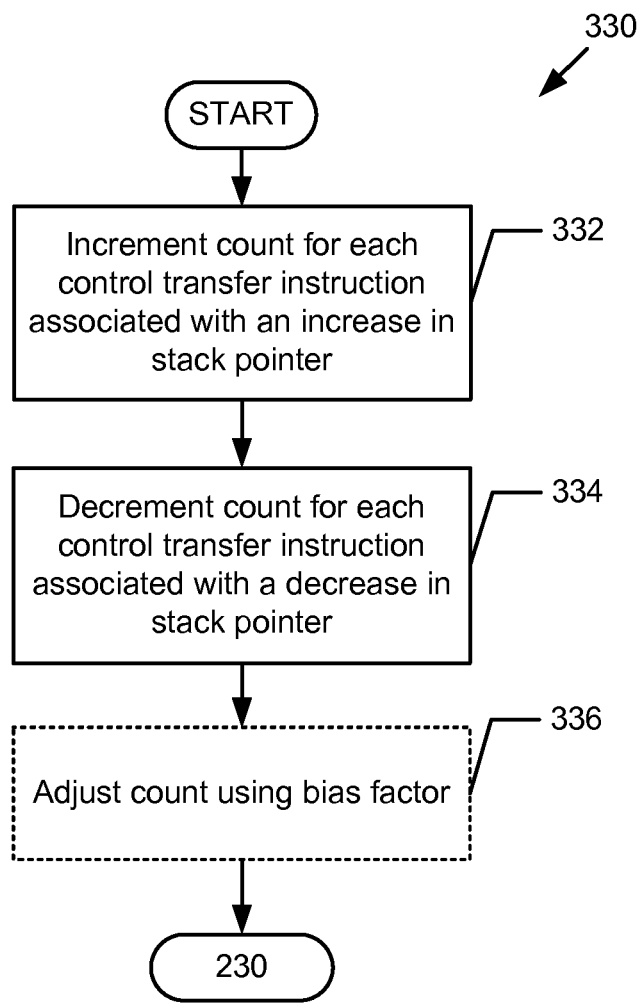

Referring now to FIG. 3C, shown is a sequence 330 for determining a metric, in accordance with one or more embodiments. In particular, the sequence 330 illustrates an exemplary expansion of the steps involved in performing step 220 (shown in FIG. 2). In one or more embodiments, the sequence 330 may be part of the ROP detection logic 140 shown in FIG. 1A. The sequence 330 may be implemented in hardware, software, and/or firmware. In firmware and software embodiments it may be implemented by computer executed instructions stored in a non-transitory computer readable medium, such as an optical, semiconductor, or magnetic storage device.

At step 332, a count may be incremented for each instance of a control transfer instruction associated with an increase in the stack pointer. For example, referring to FIG. 1B, the accumulator 142 may determine whether a jump instruction is associated with an increase in the stack pointer. In response to such a determination, the accumulator 142 may increment a counter by one.

At step 334, the count may be decremented for each instance of a control transfer instruction associated with a decrease in the stack pointer. For example, referring to FIG. 1B, the accumulator 142 may determine whether a jump instruction is associated with a decrease in the stack pointer, and if so, may decrement the counter by one.

At step 336, the count may optionally be adjusted by a bias factor. For example, referring to FIG. 1B, the bias logic 146 may divide or otherwise reduce the counter value of the accumulator 142 in order to reduce the effect of the natural imbalances. After step 336, the sequence 330 continues at step 230 (shown in FIG. 2).

Figure 3D:
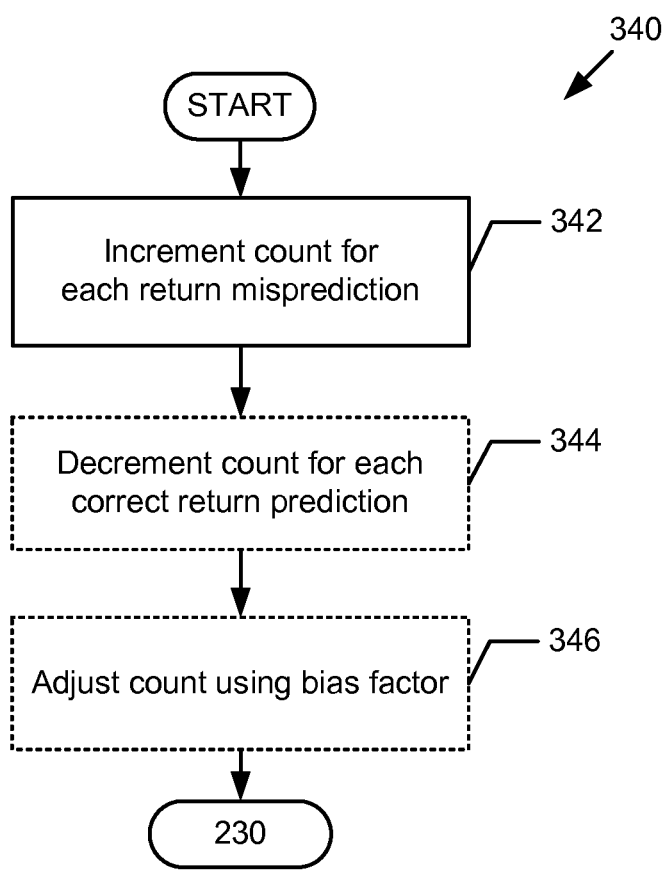

Referring now to FIG. 3D, shown is a sequence 340 for determining a metric, in accordance with one or more embodiments. In particular, the sequence 340 illustrates an exemplary expansion of the steps involved in performing step 220 (shown in FIG. 2). In one or more embodiments, the sequence 340 may be part of the ROP detection logic 140 shown in FIG. 1A. The sequence 340 may be implemented in hardware, software, and/or firmware. In firmware and software embodiments it may be implemented by computer executed instructions stored in a non-transitory computer readable medium, such as an optical, semiconductor, or magnetic storage device.

At step 342, a count may be incremented for each return misprediction. For example, referring to FIG. 1B, the accumulator 142 may interact with the return stack buffer 136 to detect a return misprediction. In response to such a determination, the accumulator 142 may increment a counter by one.

At step 344, the count may optionally be decremented for each correct return prediction. For example, referring to FIG. 1B, the accumulator 142 may interact with the return stack buffer 136 to detect a correct return prediction. In response to such a determination, the accumulator 142 may decrement a counter by one. Alternatively, in some embodiments, the count may not be decremented for each correct return prediction. For example, in some embodiments, the count may be reset to zero for each correct return prediction. In another example, in some embodiments, the count may not be altered in response to a correct return prediction.

At step 346, the count may optionally be adjusted by a bias factor. For example, referring to FIG. 1B, the bias logic 146 may divide or otherwise reduce the counter value of the accumulator 142 in order to reduce the effect of the natural imbalances. After step 346, the sequence 340 continues at step 230 (shown in FIG. 2).

Figure 3E:
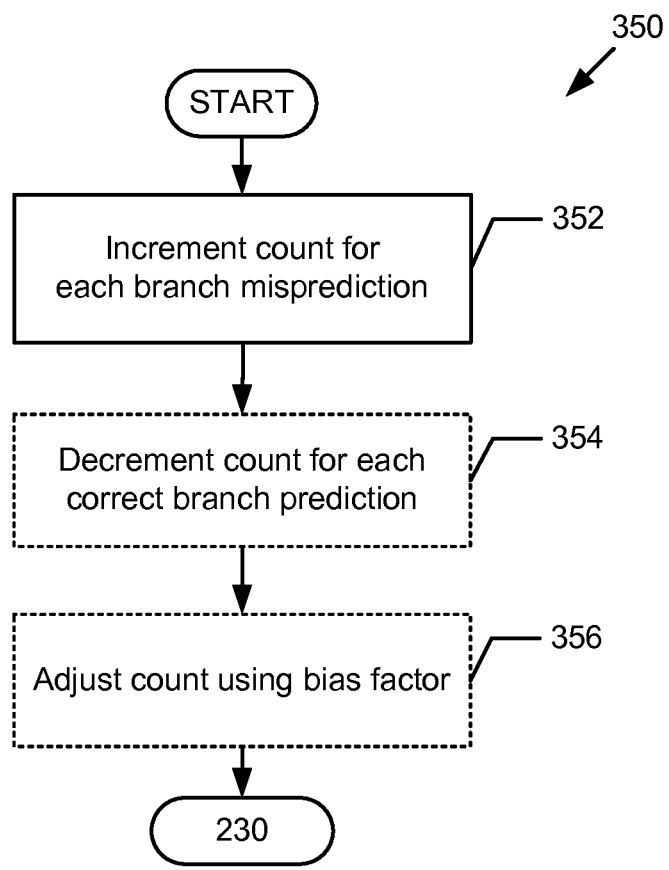

Referring now to FIG. 3E, shown is a sequence 350 for determining a metric, in accordance with one or more embodiments. In particular, the sequence 350 illustrates an exemplary expansion of the steps involved in performing step 220 (shown in FIG. 2). In one or more embodiments, the sequence 350 may be part of the ROP detection logic 140 shown in FIG. 1A. The sequence 350 may be implemented in hardware, software, and/or firmware. In firmware and software embodiments it may be implemented by computer executed instructions stored in a non-transitory computer readable medium, such as an optical, semiconductor, or magnetic storage device.

At step 352, a count may be incremented for each branch misprediction. For example, referring to FIG. 1B, the accumulator 142 may interact with the branch prediction unit 137 to detect any branch misprediction. In response to such a determination, the accumulator 142 may increment a counter by one. Alternatively, in some embodiments, the accumulator 142 may increment a counter only in response to detecting a particular type of branch misprediction (e.g., a mispredicted indirect branch).

At step 354, the count may optionally be decremented for each correct branch prediction. For example, referring to FIG. 1B, the accumulator 142 may interact with the branch prediction unit 137 to detect a correct branch prediction. In response to such a determination, the accumulator 142 may decrement a counter by one. Alternatively, in some embodiments, the count may not be decremented for each correct branch prediction. For example, in some embodiments, the count may be reset to zero for each correct branch prediction. In another example, in some embodiments, the count may not be altered in response to a correct branch prediction.

At step 356, the count may optionally be adjusted by a bias factor. For example, referring to FIG. 1B, the bias logic 146 may divide or otherwise reduce the counter value of the accumulator 142 in order to reduce the effect of the natural imbalances. After step 356, the sequence 350 continues at step 230 (shown in FIG. 2).

Note that the examples shown in FIGS. 1A-1B, 2, and 3A-3E are provided for the sake of illustration, and are not intended to limit any embodiments. For instance, while the above examples describe incrementing or decrementing the accumulator 142 by one, embodiments are not limited in this regard. For example, the accumulator 142 may be incremented by a first amount (e.g., two, four, five, etc.) in response to a first control transfer event, may be decremented by a second amount in response to a second control transfer event, etc. Further, it is contemplated that the ROP detection logic 140 may use any type of control transfer events, and/or any combination thereof.

Note also that, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of components (e.g., additional accumulators 142 and/or comparators 144) in addition to those shown, and that different arrangement of the components shown may occur in certain implementations. Further, it is contemplated that specifics in the examples shown in FIGS. 1A-1B, 2, and 3A-3E may be used anywhere in one or more embodiments.

Figure 4:
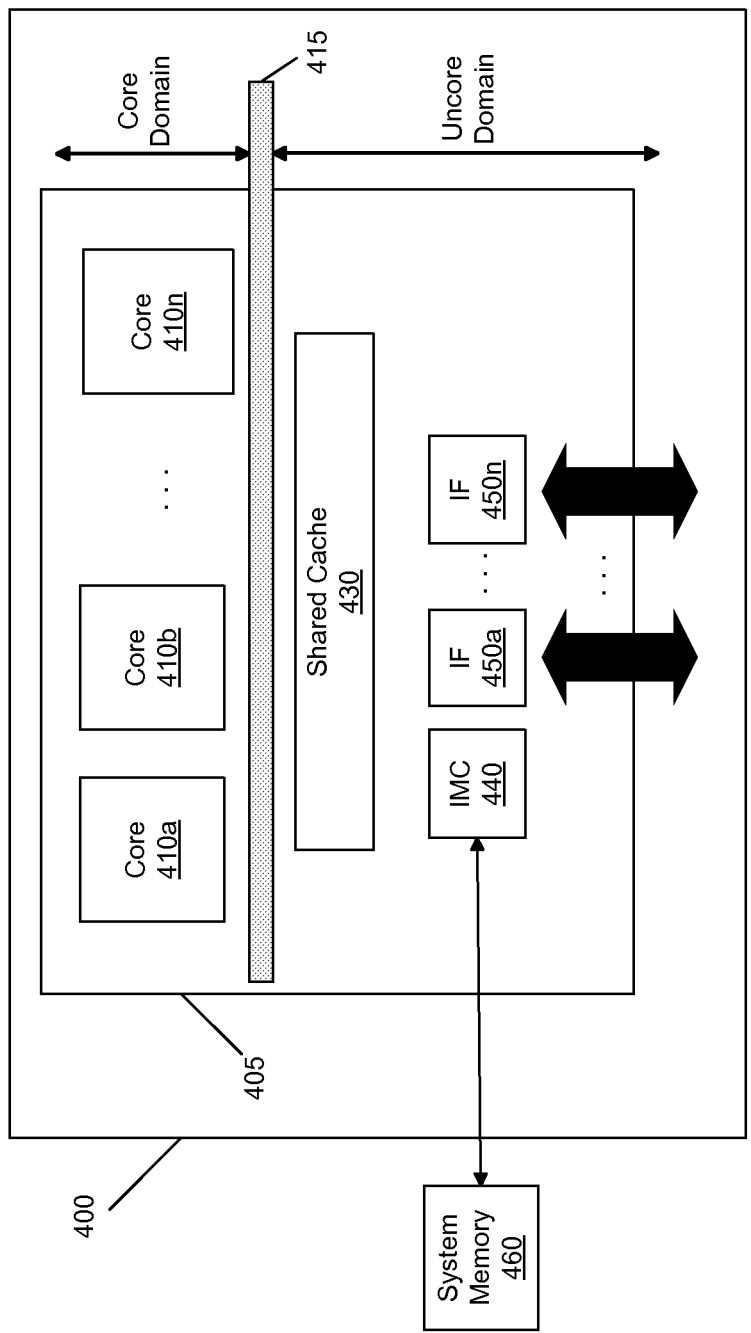
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440 and various interfaces 450.

Although not shown for ease of illustration in FIG. 4, in some embodiments, each of the cores 410a-410n may include the ROP detection logic 140 shown in FIG. 1A-1B. Alternatively, in some embodiments, some or all of the ROP detection logic 140 may be included in the uncore domain 420, and may thus be shared across the cores 410a-410n.

With further reference to FIG. 4, the processor 400 may communicate with a system memory 445, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
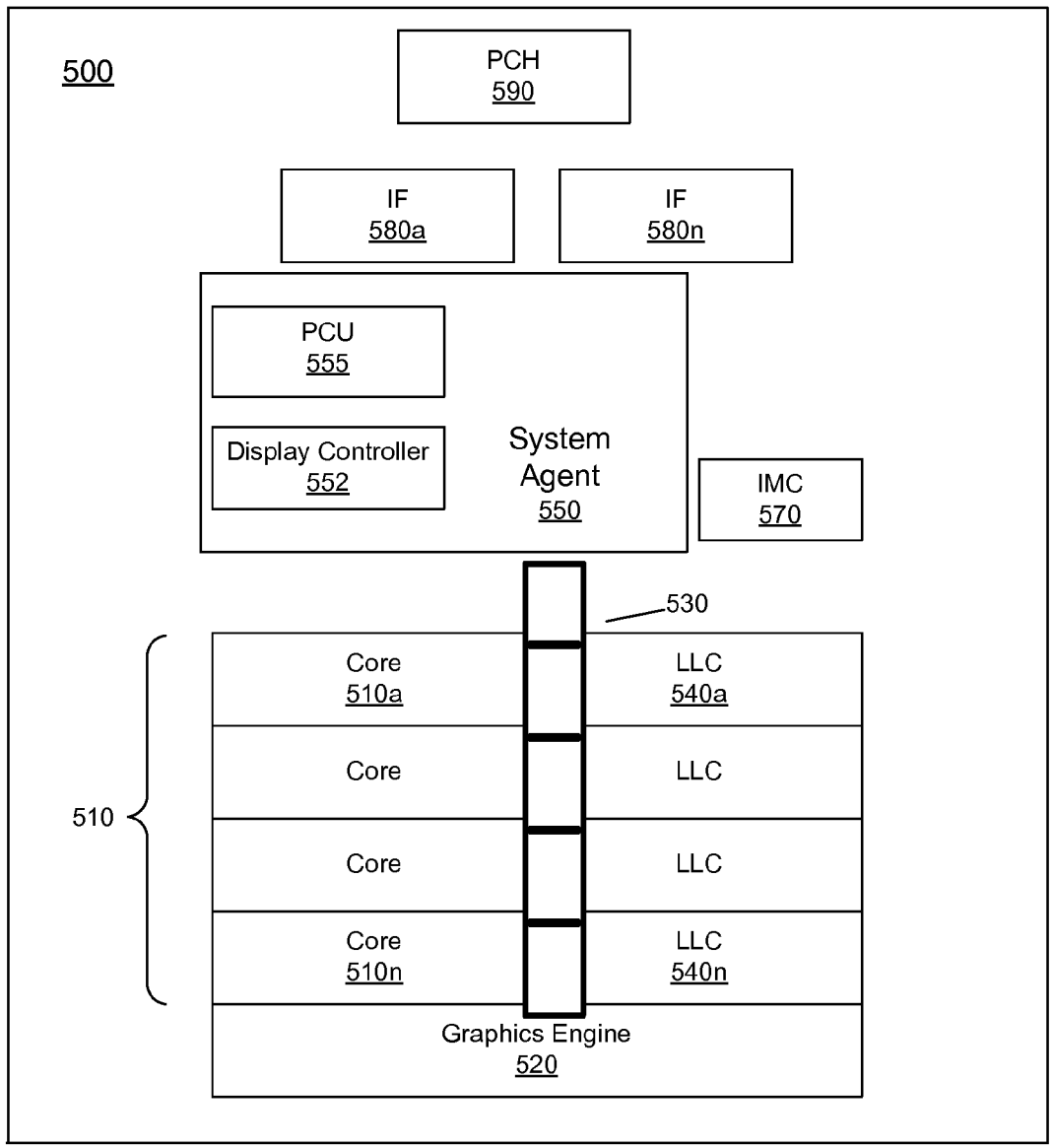
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Each of the cores 510a-510n can include the ROP detection logic 140 described above with reference to FIGS. 1A-1B. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 550 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, understand the scope of the present invention is not limited in this regard.

Figure 6:
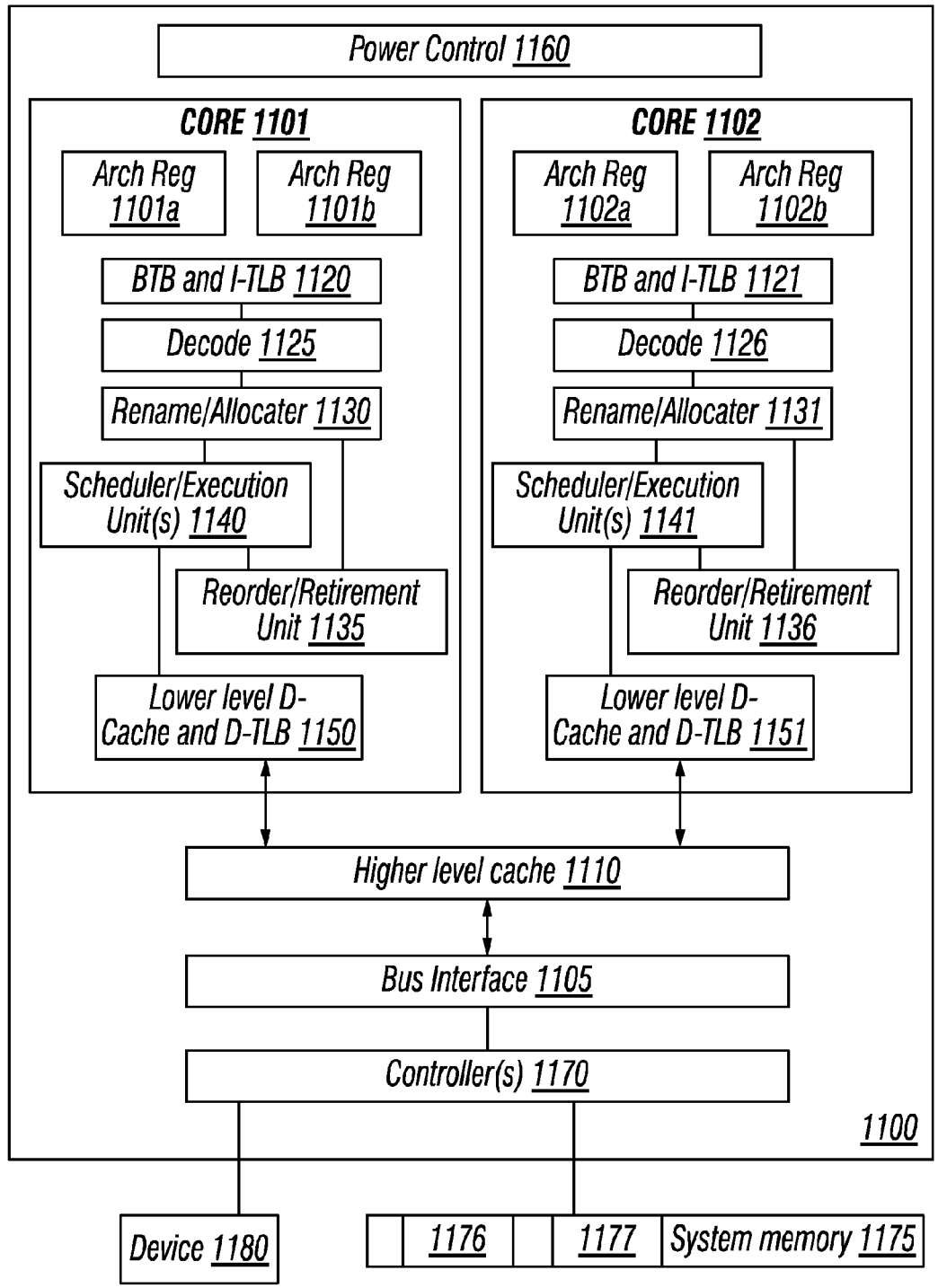
FIG. 6 is a block diagram of an embodiment of a processor including multiple cores is illustrated.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above.

As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., the actions shown in FIGS. 2-3E). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device

1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
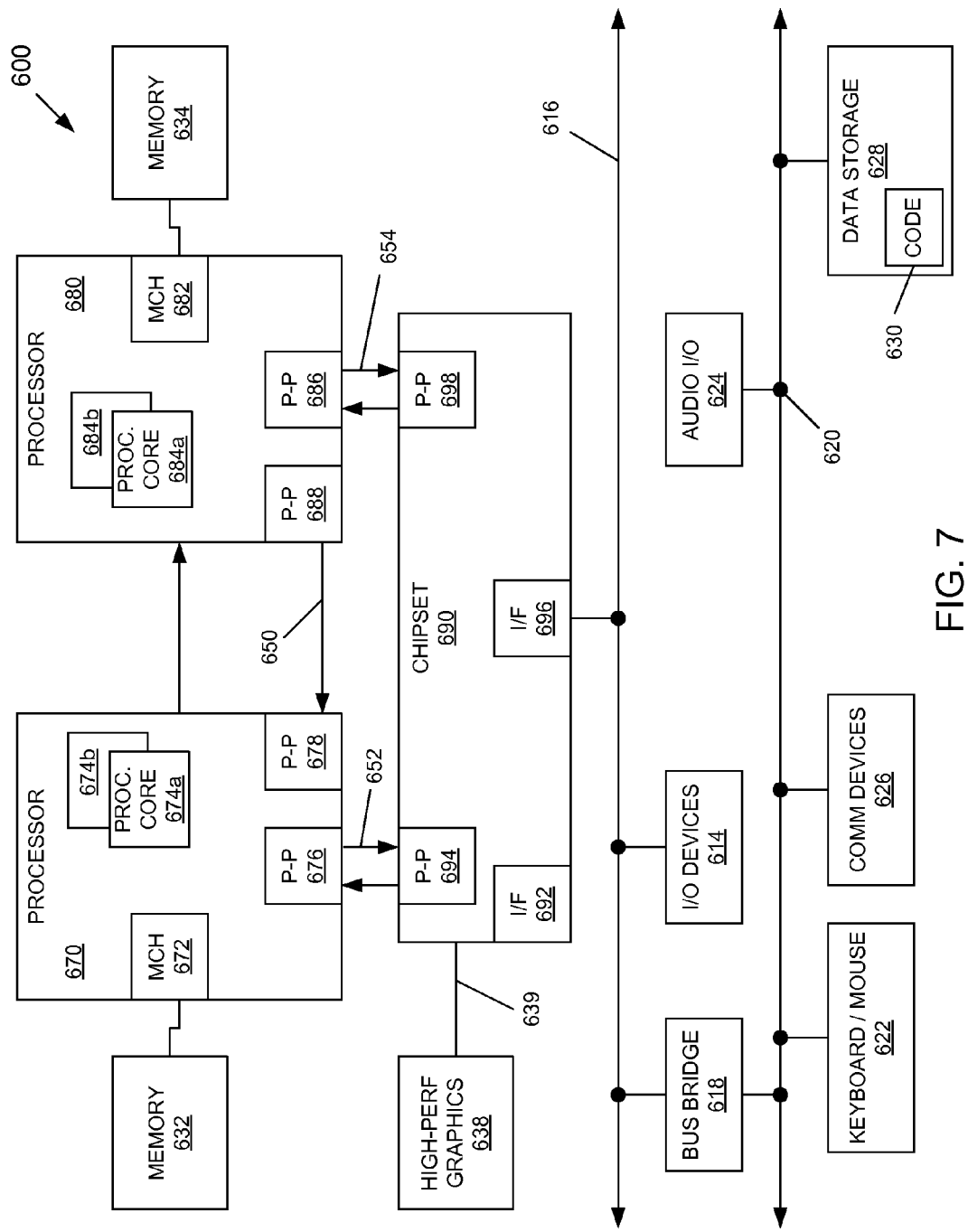
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include the ROP detection logic 140 described above with reference to FIGS. 1A-1B.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
   a Return Oriented Programming (ROP) detection unit to:
      adjust a count in a first direction in response to detection of one or more control transfer events of a first type and adjust the count in a second direction in response to detection of one or more control transfer events of a second type; and
      in response to a determination that the count exceeds a threshold, provide an indication of a possible ROP attack.

2. The processor of claim 1, wherein the ROP detection unit comprises an accumulator to store the count.

3. The processor of claim 1, wherein the ROP detection unit is to increment the count in response to an instance of a subroutine return instruction, wherein the subroutine return instruction is a control transfer event of the first type.

4. The processor of claim 3, wherein the ROP detection unit is to decrement the count in response to an instance of a subroutine call instruction, wherein the subroutine call instruction is a control transfer event of the second type.

5. The processor of claim 3, wherein the ROP detection unit is further to increment the count in response to a return misprediction.

6. The processor of claim 3, wherein the ROP detection unit is further to increment the count in response to an instance of a control transfer instruction associated with a stack pop instruction.

7. The processor of claim 3, wherein the ROP detection unit is further to increment the count in response to an instance of a control transfer instruction associated with an increase in a stack pointer.

8. The processor of claim 1, wherein the indication of the possible ROP attack is to trigger a protection application to take one or more actions to address the ROP attack.

9. The processor of claim 1, wherein the ROP detection unit is further to freeze a branch instruction log when the count exceeds the threshold.

10. A processor comprising:
an accumulator to generate a count in response to detection of a plurality of types of control transfer events, wherein the accumulator is to update the count in a first direction in response to a first control transfer event type and update the count in a second direction in response to a second control transfer event type; and
a comparator to provide a notification of a Return Oriented Programming (ROP) attack when the count exceeds a threshold during a window.

11. The processor of claim 10, further comprising an instruction detector to detect an execution of a control transfer instruction, wherein the plurality of types of control transfer events includes the execution of the control transfer instruction.

12. The processor of claim 10, further comprising a return stack buffer to detect a return misprediction, wherein the plurality of types of control transfer events includes the return misprediction.

13. The processor of claim 10, further comprising a branch prediction unit to detect a branch misprediction, wherein the plurality of types of control transfer events includes the branch misprediction.

14. The processor of claim 10, wherein the plurality of types of control transfer events includes a pair of associated instructions.

15. The processor of claim 10, further comprising bias logic to adjust the count to reduce at least one bias effect due to a natural imbalance.

16. The processor of claim 10, further comprising control logic to adjust the threshold based on a desired level of protection against ROP attacks.

17. A non-transitory machine-readable medium having stored thereon instructions, which if performed by a machine cause the machine to perform a method comprising:
detecting, by instruction control logic of a hardware processor, one or more call instructions and one or more return instructions;
updating, by Return Oriented Programming (ROP) detection logic of the hardware processor, a count in a first direction in response to the one or more call instructions and updating the count in a second direction in response to the one or more return instructions; and
in response to a determination that the count exceeds a threshold during a window, notifying a protection application of a ROP attack.

18. The machine-readable medium of claim 17, wherein the method further comprises updating the count in the second direction in response to a stack pivot.

19. The machine-readable medium of claim 17, wherein the method further comprises updating the count in the second direction in response to a particular type of misprediction.

20. The machine-readable medium of claim 17, wherein the method further comprises, in response to a determination that the count exceeds the threshold during the window, freezing contents of a branch instruction log of the hardware processor.

21. The processor of claim 10, wherein the processor further comprises:
an instruction detector to detect at least some of the plurality of types of control transfer events and to send a detection signal to the accumulator, wherein the detection signal is to indicate a type of control transfer event.

* * * * *